United States Patent [19]

Bailey et al.

[11] 4,298,365
[45] Nov. 3, 1981

[54] METHOD OF MAKING A SOOT PREFORM COMPOSITIONAL PROFILE

[75] Inventors: Alan C. Bailey, Painted Post; Alan J. Morrow, Elmira, both of N.Y.

[73] Assignee: Corning Glass Works, Corning, N.Y.

[21] Appl. No.: 165,652

[22] Filed: Jul. 3, 1980

[51] Int. Cl.³ .................. C03B 19/06; C03B 37/025; C03B 37/075
[52] U.S. Cl. ........................................ 65/3.12; 65/32; 65/18.4
[58] Field of Search .................... 65/3.12, 18.2, 32; 427/163; 264/1.2, 1.5, 1.7

[56] References Cited

U.S. PATENT DOCUMENTS

| | | | |
|---|---|---|---|
| 3,823,995 | 7/1974 | Carpenter | 65/18.2 X |
| 4,042,404 | 8/1977 | Schultz | 65/18.2 X |
| 4,204,850 | 5/1980 | Dominick et al. | 65/3.12 |
| 4,251,251 | 2/1981 | Blankenship | 65/3.12 |

Primary Examiner—Richard V. Fisher
Attorney, Agent, or Firm—William J. Simmons, Jr.

[57] ABSTRACT

A method of making solid glass articles by the flame hydrolysis technique. A thin stratum of low viscosity glass soot is applied to the surface of a mandrel. First and second coatings of glass soot are deposited on the surface of the thin stratum to form a porous preform. The refractive index of the soot particles of the first coating is greater than that of the soot of the second coating, and the soot of the first coating has a viscosity lower than that of the second coating. The mandrel is removed, and the soot preform is subjected to a high temperature whereby it is consolidated to form a dense glass blank. The glass surface tension and the relative viscosities of the inner and outer portions of the preform cause the aperture to close during the consolidation process. The thin stratum, which preferably includes $P_2O_5$, smoothes over the damage caused by removing the mandrel and reduces or even eliminates seed formation at the axis of the resultant glass blank. The blank may be heated and drawn into a filament, or it may be sliced into optical windows, lenses or the like.

13 Claims, 8 Drawing Figures

METHOD OF MAKING A SOOT PREFORM COMPOSITIONAL PROFILE

BACKGROUND OF THE INVENTION

The present invention relates to an optical waveguide soot preform having an improved compositional profile and to a method of making the same. More particularly, this invention relates to a preform having such a compositional profile that the preform aperture is readily closed to form a seed-free blank during the soot consolidation process or during the process of drawing a fiber directly from a soot preform. This invention also relates to the resultant optical waveguide fiber.

Certain glass making processes, particularly vapor deposition processes, have been commonly employed in the formation of optical waveguide blanks. In one such process, referred to as the flame hydrolysis process, a plurality of constituents in vapor form are entrained in a gaseous medium in predetermined amounts and thereafter are oxidized in a flame to form soot having a predetermined composition. The soot is applied to the surface of a rotating cylindrical mandrel or starting member. After a first coating of soot is deposited to form the core glass, the composition of the soot is changed to form a cladding glass coating. Heretofore, the mandrel has usually been removed and the soot preform has been sintered to form a consolidated glass draw blank that is free from particle boundaries. The resulting cylindrical, hollow draw blank is heated to a temperature at which the material has a low enough viscosity for drawing and is drawn to reduce the diameter thereof until the inner walls of the hollow member collapse. Continued drawing further reduces the diameter until an optical waveguide fiber having the desired dimensions is formed. Various methods employing the flame hydrolysis technique for forming glass optical waveguide fibers are taught in U.S. Pat. Nos. Re. 28,029; 3,711,262; 3,737,293; 3,823,995 and 3,826,560, the latter two patents being directed to the formation of gradient index waveguides.

The following problems have been encountered when practicing the method wherein the consolidated draw blank was formed with a longitudinal aperture caused by removal of the mandrel. Because of the dopants added to the core region of the blank to increase the refractive index thereof, the coefficient of expansion of that region is greater than that of the cladding region. Thus, when the blank cools after the consolidation process, the central region is put into a state of tension. The aperture in the center of the blank, which has remained after removal of the mandrel, presents a free surface in the region of high tensile force where breaks are readily initiated.

Prior to drawing the blank into a fiber it has been necessary to subject the blank aperture to an acid wash followed by careful rinsing to avoid contamination which could render the resultant fiber useless for the purposes for which it has been produced. This acid wash increased the cost of producing optical waveguides. Also, the rate of drawing the fiber has been limited by the necessity of closing the aperture of the draw blank during the drawing process.

The aforementioned disadvantages have been overcome by the methods disclosed in copending application Ser. No. 44,192 of M. G. Blankenship entitled "Method of Making Optical Devices" filed May 31, 1979, now U.S. Pat. No. 4,251,251, and in U.S. Pat. No. 4,157,906 issued to A. C. Bailey.

In accordance with the method disclosed in the Blankenship application the mandrel is removed, and the resultant hollow soot preform is subjected to a relatively high consolidation temperature. As the preform is heated the soot consolidates and, due to the predetermined relative viscosities of the core and cladding materials, the aperture closes. More specifically, the Blankenship application teaches that the aperture closing process is facilitated by selecting the core and cladding materials such that the ratio $V_1/V_2$ of the viscosity of the core to that of the cladding is $\frac{1}{2}$ or less, ratios as low as 1/2000 being operative.

The Blankenship application teaches that care must be taken to minimize damage done to the preform while removing the mandrel since such damage can result in the formation of seeds at the center of the resultant consolidated draw blank. Damage to the aperture can be reduced by forming a soft parting layer on the surface of the mandrel and thereafter building up the preform with hard soot. This parting layer can consist of soft soot, carbon or the like. A method of coating a mandrel with carbon is disclosed in U.S. Pat. No. 4,204,850 issued to E. K. Dominick et al.

Even when the aforementioned precautions have been taken, seeds can form along the centerline of the consolidated blank when the aperture is closed during consolidation. The tendency for such centerline seeds to form is dependent, inter alia, upon glass composition. Certain glass compositions capable of providing desirable optical properties could not be employed in the formation of soot preforms in which the aperture was to be closed during consolidation because of the tendency for centerline seed formation.

The method of the Bailey patent involves drawing an unconsolidated soot preform directly into a fiber. This method has also experienced centerline seed problems.

SUMMARY OF THE INVENTION

It is therefore an object of the present invention to provide a method of forming a seed-free, solid draw blank, the overall composition of which is such that desired optical characteristics are obtained.

Another object is to provide a soot preform having a compositional profile such that the aperture formed by removing the mandrel readily closes during consolidation to form a seed-free blank from which optical devices such as optical waveguide fibers can be formed.

A further object is to provide a soot preform having a compositional profile such that it can be drawn directly into a seed-free fiber.

Yet another object of this invention is to provide an economical method of forming an optical waveguide fiber, which method also overcomes the heretofore noted disadvantages.

These and additional objects, features and advantages of the present invention will become apparent to those skilled in the art from the following detailed description and the attached drawings on which, by way of example, only the preferred embodiments of this invention are illustrated.

This invention relates to an improved method of forming glass articles by the flame hydrolysis process. Briefly, this method comprises applying a thin stratum of low viscosity soot to the surface of a cylindrical mandrel. A first coating of glass soot is applied to the outside peripheral surface of the stratum, and a second coating of glass soot of lower refractive index than the first coating is applied over the outside peripheral surface of the first coating. The viscosity of the stratum is lower than that of the first coating, and the viscosity of the first coating is lower than that of the second coating at a temperature at which the soot preform consolidates. The mandrel is removed to form a soot preform having an aperture therein. The stratum is sufficiently thick that a continuous layer of low viscosity stratum soot remains on the inner surface of the first coating after the mandrel has been removed. The resultant hollow preform is thereafter formed into the desired glass article.

DETAILED DESCRIPTION OF THE INVENTION

It is to be noted that the drawings are illustrative and symbolic of the invention, and there is no intention to indicate scale or relative proportions of the elements shown therein.

Figure 1:
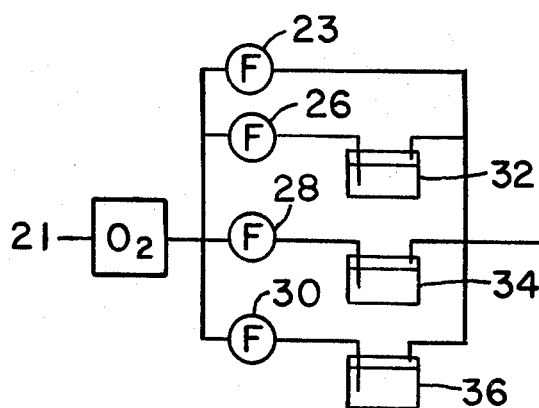
FIGS. 1 and 2 illustrate the formation of a soot preform on a mandrel.
Figure 1:
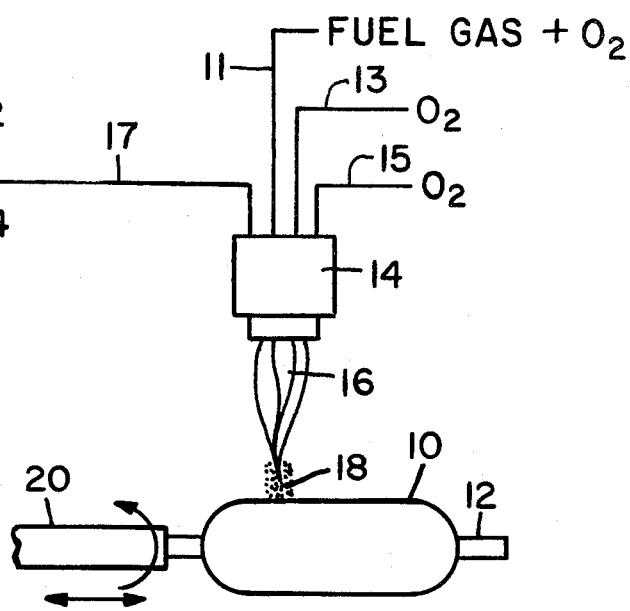
Figure 2:
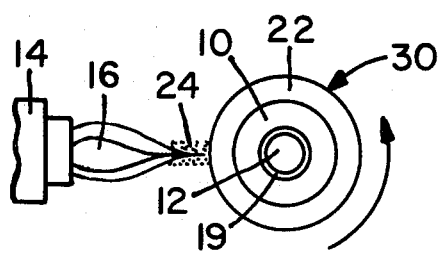

Optical waveguide soot preforms are conventionally prepared in accordance with the methods illustrated in FIGS. 1 and 2. A coating 10 of glass soot is applied to cylindrical mandrel 12 by means of flame hydrolysis burner 14. A suitable burner, which is disclosed in U.S. Pat. No. 4,165,223 issued to D. R. Powers, includes a burner face having a central orifice surrounded by a plurality of concentric rings of orifices. Fuel gas and oxygen or air are supplied to burner 14 through line 11, and the resultant mixture emanates from one of the rings of orifices on the burner face. This mixture is burned to produce flame 16. A gas-vapor mixture supplied through line 17 emanates from the centrally disposed burner orifice and is oxidized within flame 16 to form a glass soot that leaves the flame in a stream 18, which is directed toward mandrel 12. A ring of orifices having a radius less than that of the ring of burner orifices is referred to as the inner shield orifices, and a ring of orifices having a radius larger than that of the burner orifices is referred to as the outer shield orifices. Oxygen is supplied to the inner and outer shield orifices through lines 13 and 15, respectively. Mandrel 12 is supported by means of handle 20 and is rotated and translated as indicated by arrows adjacent thereto in FIG. 1 for uniform deposition of soot. This method can be employed to produce either step index or gradient index waveguides.

A second coating 22 of soot is applied over the outside peripheral surface of first coating 10 as shown in FIG. 2. In accordance with well-known practice the refractive index of coating 22 is made lower than that of coating 10 by changing the composition of the soot 24 being produced in flame 16. This can be accomplished by changing the concentration or type of dopant material being introduced into the flame, or by omitting the dopant material. Mandrel 12 is again rotated and translated to provide a uniform deposition of coating 22, the composite structure including first coating 10 and second coating 22 constituting an optical waveguide soot preform 30.

Numerous reactant delivery systems known in the prior art are suitable for delivering gases and reactant vapors to line 17. Reference is made in this regard to the teachings of U.S. Pat. Nos. 3,826,560; 4,148,621 and 4,173,305. In the system shown in FIG. 1, which is illustrative of systems which may be employed, flow meters are represented by a circle having the letter "F" therein. A source 21 of oxygen is connected by flow meter 23 to inlet tube 17 and by flow meters 26, 28 and 30 to reservoirs 32, 34 and 36, respectively. Reservoirs 32, 34 and 36 contain normally liquid reactant materials which are introduced into tube 17 by bubbling oxygen or other suitable carrier gas therethrough. Not shown is an arrangement of mixing valves and shutoff valves which may be utilized to meter flows and to make other necessary adjustments in composition.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index. Many suitable materials have been used as a dopant alone or in combination with each other to increase the refractive index of fused silica. These include, but are not limited to, titanium oxide, tantalum oxide, aluminum oxide, lanthanum oxide, phosphorus oxide and germanium oxide.

The mandrel can be removed from the soot preform by merely mechanically twisting and pulling it from the preform. Care must be taken to minimize damage done to the preform while removing the mandrel.

In order to minimize or eliminate the formation of seeds during the process of simultaneously consolidating the soot preform and closing the aperture therein, or during the process of drawing a fiber therefrom, the present invention contemplates the formation of a thin stratum 19 of low viscosity soot on the mandrel prior to the formation of first coating 10. Since the viscosity of the thin soot stratum is significantly lower than that of the remainder of the preform, it is believed that it causes a smoothing over of irregularities and bait damage that would normally trap seeds during aperture closure. The low viscosity stratum of soot must be sufficiently thick that a continuous layer thereof remains after the mandrel has been removed. If the stratum of low viscosity soot is too thin, regions thereof will be completely scraped away during mandrel removal, thereby giving rise to the possibility of seed formation in that region of the glass draw blank. It is believed that stratum thicknesses as low as 0.15 mm will be effective. However, in order to avoid the possibility that excessive damage to the soot preform caused by mandrel removal may eliminate a region of low viscosity soot, a minimum stratum thickness of 0.3 mm is preferred. The stratum thickness should be as low as possible and yet be effective. The maximum stratum thickness actually employed was 0.6 mm, but it could be greater than this value. It is preferred that a layer of release material such as the carbon layer taught in the aforementioned Dominick et al. patent be initially applied to the mandrel to minimize damage to the low viscosity stratum.

To form the stratum of low viscosity soot an oxide such as $P_2O_5$, $B_2O_3$ or the like, may be employed. If $SiO_2$ is the base core glass to which a dopant oxide has been added for the purpose of increasing refractive index, then the viscosity-depressing oxide can be employed in addition to or in place of the dopant oxide. Obviously, the viscosity-depressing oxide must satisfy the constraint previously set forth herein, i.e., that the resultant glass possess minimum light attenuation characteristics. The glass must also be suitable for being formed into the desired optical article.

Figure 3:
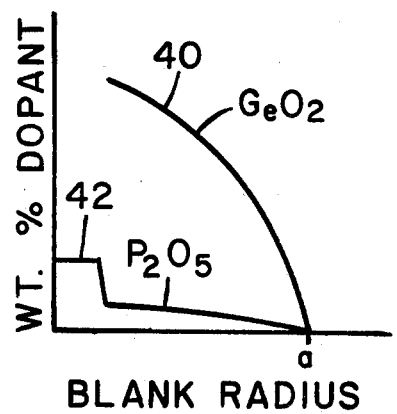
FIG. 3 is a graph showing the concentration of dopant oxides as a function of blank radius in the core portion of a blank formed in accordance with the present invention.
Figure 4:
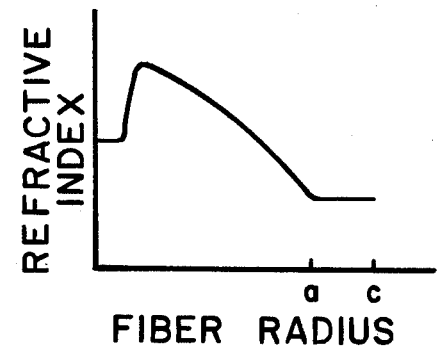
FIG. 4 is a graph showing refractive index as a function of radius in a fiber drawn from a blank, the core dopant concentration of which is illustrated in FIG. 3.

If the viscosity-depressing oxide is employed in place of the dopant oxide in the thin stratum, the refractive index profile of the resultant fiber may include a dip at the axis. For example, the core of a gradient index fiber may be formed of $SiO_2$ containing the dopant $GeO_2$ to increase the refractive index, the percentage of $GeO_2$ present increasing with decreasing radius as illustrated by curve 40 of FIG. 3. If a thin stratum of $SiO_2$ doped with $P_2O_5$ is employed at the center of the soot preform as illustrated by curve 42, the refractive index of the resultant fiber will be as shown in FIG. 4. The dip in the center of the refractive index curve will have the effect of lowering the bandwidth of the fiber, an undesirable effect for certain applications.

Figure 5:
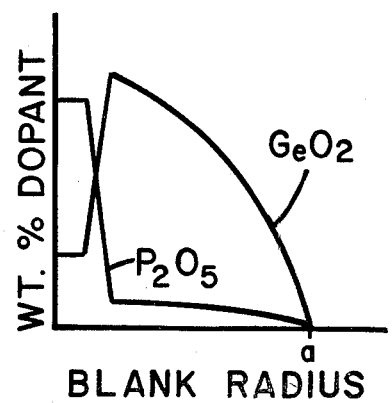
FIG. 5 is a graph showing a further core concentration profile in accordance with the present invention.
Figure 6:
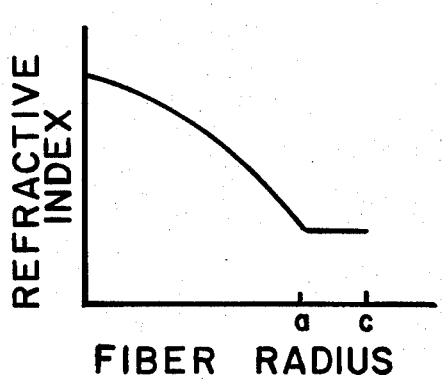
FIG. 6 is a graph showing refractive index as a function of radius in a fiber drawn from a blank, the core dopant concentration of which is illustrated in FIG. 5.

The dip at the center of the refractive index curve can be substantially eliminated by employing a refractive index increasing dopant oxide in addition to a viscosity-depressing oxide. For example, the thin stratum of low viscosity glass may comprise $SiO_2$ doped with a sufficient amount of $GeO_2$ and $P_2O_5$, as shown in FIG. 5, that the refractive index of the stratum is a continuation of the refractive index of the adjacent portion of the core as shown in FIG. 6. When another oxide is employed in addition to the $P_2O_5$, the amount of $P_2O_5$ must be correspondingly increased to provide a sufficiently low viscosity to prevent seed formation in the final product. If a slight amount of $GeO_2$ is added to the stratum, then the amount of $P_2O_5$ therein must be slightly increased, the amount of viscosity-depressing dopant being increased as the amount of other dopants increase. For example, when the stratum also contained 10 wt. % of $GeO_2$, 15 wt. % $P_2O_5$ was required.

One end of the soot preform can be attached to a handle and supported in a conventional draw furnace according to the teachings of the Bailey patent, the teachings of which are incorporated herein by reference. A furnace such as that disclosed in U.S. Pat. No. 4,126,436 may be employed. The preform is advanced into the hot zone of the furnace whereby the soot begins to consolidate. The temperature in the hot zone is preferably such that the viscosity of the core glass is between $10^8$ and $10^3$ poise. The desired viscosity depends upon the filament draw rate. The tip of the consolidated glass preform is contacted by the end of a low expansion glass rod to initiate drawing of the filament. The preform is continuously fed into the hot zone of the furnace where it continuously consolidates in a helium rich atmosphere and is drawn into a filament. Various gases such as helium, chlorine, and the like may be flowed into the preform aperture to remove water from the soot, and flushing gases such as helium, oxygen, nitrogen and the like may be flowed through the furnace during drawing.

Figure 7:
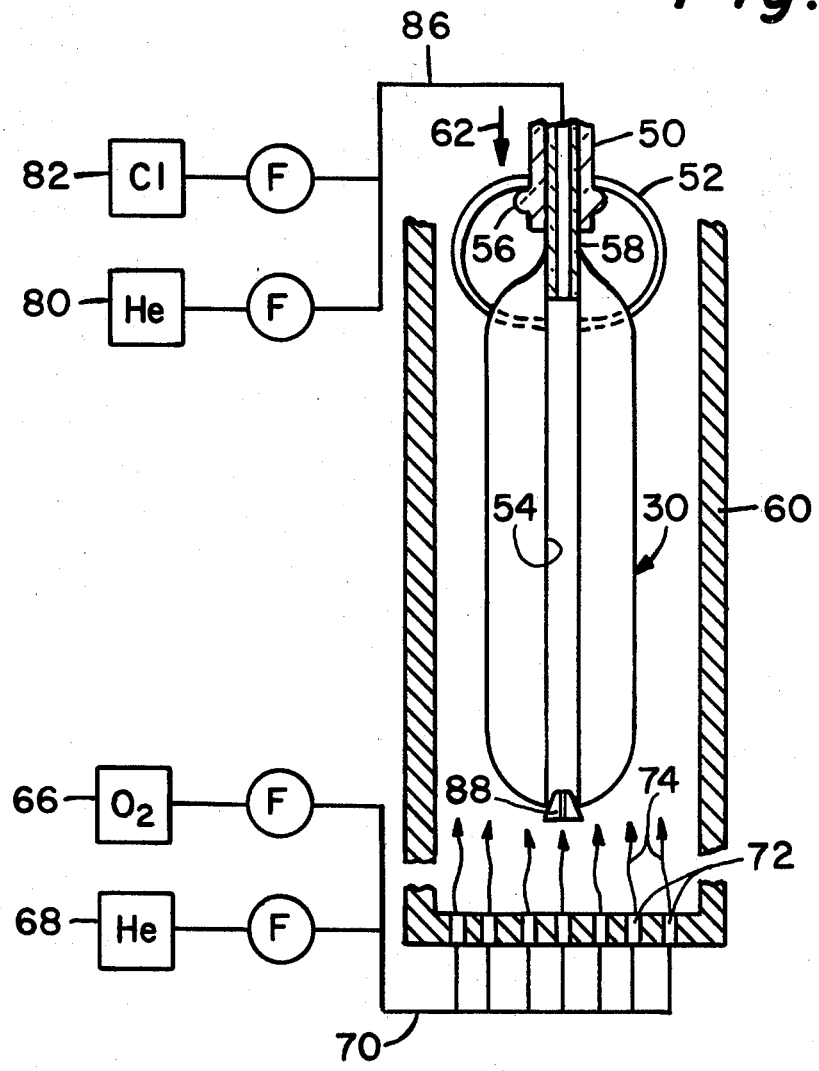
FIG. 7 is a schematic representation of a consolidation furnace and a consolidation atmosphere system.

The soot preform could also be separately consolidated in accordance with the method of the Blankenship application and thereafter drawn into a fiber. To consolidate preform 30, it is suspended from tubular support 50 as shown in FIG. 7. Two platinum wires, of which only wire 52 is shown, protrude through perform 30 on opposite sides of aperture 54 and are affixed to support 50 just above flange 56. Although the end of gas conducting tube 58 is shown protruding from tubular support 50 and into the adjacent end of preform 30, certain embodiments of the present invention do not require tube 58. The preform could also be suspended from an integral handle which forms a part of the mandrel supporting structure during soot deposition. Such an integral handle is disclosed in copending patent application of A. C. Bailey et al., Ser. No. 165,649 entitled "Support Member for an Optical Waveguide Preform" filed on even date herewith.

Figure 8:
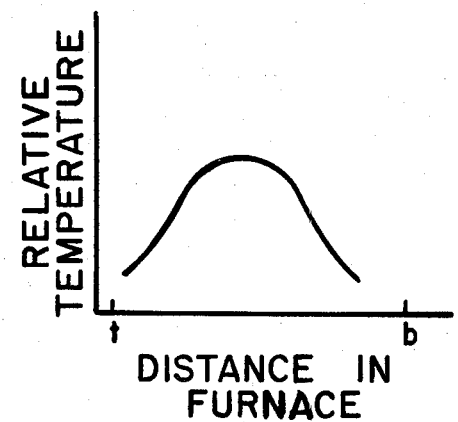
FIG. 8 is a graph illustrating the temperature profile of a typical consolidation furnace.

The vertical sidewalls of furnace 60 are broken to illustrate that the relative depth thereof is greater than that shown. The furnace length is usually about two to four times that of the preform. As shown in FIG. 8, wherein t and b refer to the top and bottom, respectively, of the furnace, the maximum temperature exists near the center of the furnace. Thus, a preform could be subjected to a maximum temperature of 1500° C., for example, in the center of the furnace and a temperature of about 500° C. at the top or bottom thereof.

In FIG. 7 flowmeters are schematically represented by the letter "F" within a circle, other components such as flow regulators and valves having been omitted. Sources 66 and 68 of oxygen and helium, respectively, are illustrative of the gases which may be employed as the consolidation atmosphere. These gases may be connected by a line 70 to orifices 72 in the bottom of furnace 60. Undulated arrows 74 represent the flow of the consolidation atmosphere gas from the orifices.

If water is to be removed from the soot preform during the consolidation process, a source of drying gases is connected to tube 58. In accordance with the teachings of U.S. Pat. Nos. 3,933,454 and 4,165,223 helium and a halogen, preferably chlorine, supplied by sources 80 and 82, respectively, may be connected by line 86 to gas conducting tube 58. A plug 88 having a small hole therethrough is inserted into the end of aperture 54 to enhance the flow of the drying gases through the preform interstices. The hole in the plug permits the lines and aperture to be purged of residual gases so the drying gas mixture can more quickly fill the preform aperture. Plugs of silica and borosilicate glass have been employed.

The preform is consolidated by gradually inserting it into furnace 60 as indicated by arrow 62. The preform must be subjected to gradient consolidation, a technique taught in the aforementioned U.S. Pat. No. 3,806,570, whereby the bottom tip of the preform begins to consolidate first, the consolidation continuing up the preform unitl it reaches that end thereof adjacent to tubular support 50. The consolidation step of the present invention is usually performed at a lower rate than conventional consolidation processes wherein the preform aperture does not close.

Consolidation may take place in various atmospheres described in the prior art. In accordance with the teachings of U.S. Pat. No 3,933,454 it may comprise an atmosphere rich in helium which can readily pass through the interstices of the porous soot preform to purge residual gas therefrom. The phrase "helium-rich atmosphere" as used herein means one that contains at least 90% helium. Other gases such as oxygen, nitrogen, argon, neon and mixtures thereof may be employed to flush gases from the preform during consolidation.

In accordance with the teachings of the aforementioned Blankenship application the aperture closing process is facilitated by selecting the compositions of core coating 10 and cladding coating 22 such that the ratio $V_1/V_2$ of the viscosity of the core to that of the cladding is ½ or less. Moreover, by employing thin stratum 19 of low viscosity soot as the aperture-forming surface, damage caused by mandrel removal is smoothed over, and centerline seeds are minimized or eliminated. The viscosity $V_3$ of the stratum should be such that the ratio $V_3/V_1$ is less than 1/10.

The temperature to which a soot preform should be heated to cause soot consolidation and aperture closing depends upon the compositions of the core and cladding materials. Therefore, the consolidation and aperture closing temperature will be set forth in terms of glass viscosity, a parameter that is applicable to all glass compositions. Since it is desirable to close the aperture in the shortest possible time, the consolidation temperature is preferably high enough to cause the preform viscosity to be between about $10^6$ and $10^{10}$ poise.

The contraction of the soot during sintering generates a considerable hole closing force. If the core glass is sufficiently fluid, it will sinter to clear glass before the cladding has densified significantly; the subsequent contraction of the cladding (at higher temperature and/or longer times) compresses the core with a force of 2-20 atmospheres and collapses the center hole. This method takes advantage of the enormous capillary force which causes contraction of the cladding, rather than the tiny surface tension acting on the center hole's own surface.

Other factors which affect the relative time to close the aperture include the ratio of the starting aperture to the overall preform diameter (the smaller this ratio becomes the more readily the aperture closes); the ratio of the preform core diameter to the overall diameter; and the soot density of the core relative to that of the clad (the higher the soot density of the core relative to that of the clad the more readily the aperture closes).

It is expedient to consolidate the glass soot into a dense glass and to close aperture 54 in one insertion of the preform into the consolidation furnace. The time required to completely consolidate a preform and close the aperture therein can be empirically determined by periodically withdrawing the preform from the furnace and observing the aperture size. The present invention also encompasses those processes wherein two or more insertions of the preform into the furnace are made prior to complete closure of the aperture. However, the partially consolidated preform cannot be permitted to cool to room temperature prior to closure of aperture 54 because of the risk of breaks initiating at the surface of that aperture.

After a preform has been consolidated and the aperture therein closed, the resultant draw blank can be cooled to room temperature prior to being drawn into a fiber. The draw blanks are usually flame worked to form a tip at both ends to prevent cracks from initiating from the core portion exposed at the ends thereof. Blanks are then fused at one end to a handle and cleaned using a degreasing solvent, subjected to hydrofluoric acid wash and water rinse just prior to inserting into the fiber draw furnace where they are supported by the handle. Drawing includes control of draw furnace atmosphere, e.g., 50% $N_2$ and 50% $O_2$, and a slow feed of the blank, e.g., about 4.5 cm/hr., into the hot furnace which may be between 1600° C. and 2300° C. Fiber drawing rates are about 0.5 m/sec. If the integral handle of the aforementioned Bailey et al. application is employed and if the blank is kept hot between the consolidation and draw steps, the etching and flameworking procedures can be omitted.

Since the method of the present invention results in the closing of the aperture during the consolidation process, the free surface in the center of the blank, which could have caused breakage because of the tensile force therein, is eliminated. Thus, core and cladding materials having relatively large differences in expansion characteristics may be employed in the manufacture of optical waveguides, thereby resulting in optical waveguides having higher numerical apertures. Moreover, blank cleaning has been simplified since aperture contamination has been eliminated.

The invention will be further described with reference to specific embodiments thereof which are set forth in the following examples. In these examples, which pertain to the manufacture of optical waveguides, the inside diameter of the furnace muffle is 12.7 cm, and the length thereof is 213 cm. The maximum furnace temperature was about 1450° C. in Example 1 and about 1460° C. in Examples 2-4. The rates of flow of fuel, gases and vapors are specified in Table 1. The flows for the deposition of the cladding soot coating are the same as those listed for the core coating except that no oxygen flows through the $POCl_3$ and $GeCl_4$ reservoirs.

TABLE 1

| | Flow Rates in slpm for Examples | | | |
|---|---|---|---|---|
| | 1 | 2 | 3 | 4 |
| For Stratum | | | | |
| Fuel $O_2$ | 2.34 | 1.0 | 0.8 | 0.9 |
| $CH_4$ | 3.2 | 1.4 | 1.2 | 1.2 |
| Inner Shield $O_2$ | 2.5 | 2.5 | 2.5 | 2.5 |
| Outer Shield $O_2$ | 3.0 | 6.0 | 6.0 | 6.0 |
| $O_2$ to $SiCl_4$ | 1.0 | 0.18 | 0.18 | 0.25 |
| $O_2$ to $POCl_3$ | 0.9 | 0.9 | 0.9 | 0.9 |
| $Ok_2$ to $GeCl_4$ | — | 0.196 | 0.07 | 0.11 |
| For Core | | | | |
| Fuel $O_2$ | 4.4 | 4.72 | 4.4 | 4.4 |
| $CH_4$ | 6.0 | 6.6 | 6.1 | 6.1 |
| Inner Shield $O_2$ | 2.5 | 2.5 | 2.5 | 2.5 |
| Outer Shield $O_2$ | 3.0 | 3.0 | 3.0 | 3.0 |
| $O_2$ to $SiCl_4$ | 1.0 | 1.2 | 1.0 | 1.0 |
| $O_2$ to $POCl_3$ | 0.15 | 0.45 | 0.3 | 0.3 |
| $O_2$ to $GeCl_4$ | 0.5 | 0.61 | 0.5 | 0.48 |

EXAMPLE 1

An alumina mandrel approximately 0.6 cm in diameter was secured to a handle. A layer of carbon about 0.5 mm thick was deposited on the mandrel using an acetylene torch to which no air or oxygen was supplied. Liquid SiCl₄, POCl₃ and GeCl₄ were maintained at 37° C. in first, second and third reservoirs, respectively. To form the stratum of low viscosity soot, dry oxygen was bubbled through the first and second reservoirs at the rates specified in Table 1. The resultant mixture was passed through a burner to which fuel and oxygen were fed at the rates specified. Six layers of the resultant soot produced a thin stratum having a thickness of about 0.4 mm. The composition of this soot stratum was approximately 7 wt. % $P_2O_5$ and 93 wt. % $SiO_2$.

The burner flows were then abruptly changed to the core rates listed in Table 1 to produce soot having the approximate composition of 22 wt. % $GeO_2$, 0.65 wt. % $P_2O_5$ and 77.35 wt. % $SiO_2$. A soot coating having a graded index profile was then deposited by reducing the $GeCl_4$ and $POCl_3$ carrier flows to zero on a parabolic curve. The cladding coating was deposited under similar conditions except that the only reactant vapor delivered to the burner was 1.0 slpm $SiCl_4$. The number of layers of core soot deposited in the formation of coating 10 was 282, and the number of layers of cladding soot deposited in the formation of coating 22 was 432, each burner pass along the preform constituting a single layer. Each layer required about 25 seconds to deposit. The outer diameter of layer 10 was about 1.4 cm, and the outer diameter of the soot preform was about 5.9 cm.

The resultant preform was consolidated in a furnace of the type illustrated in FIG. 7, helium and oxygen flowing from orifices 72 at rates of 44 slpm and 4 slpm, respectively. After removing the alumina mandrel, holes were drilled through the end of the preform and platinum wires were inserted through the holes for the purpose of suspending the preform in the furnace. The preform consolidated and the aperture simultaneously closed as the preform was fed through the hot zone of the furnace at a rate of 2 cm/min. The outside diameter of the resultant glass blank was about 3.1 cm. No seeds were evident in large portions of the resultant blank. The largest of these seed-free portions (approximately one-half the blank) was attached by a flame working technique to a silica rod and drawn into a fiber at a temperature of about 2000° C. The attenuation of the resultant fiber at 820 nm was 5.4 dB/km. The core diameter was about 50 mm and the outside diameter was about 125 mm. The bandwidth was 138 MHz-km.

EXAMPLE 2

A preform was fabricated as in Example 1, except that only two layers of carbon were deposited to form a total thickness of 0.1 mm. An integral silica handle of the type described in the aforementioned Bailey et al. application was attached to the mandrel, and one end of the soot preform was formed around it. Following the carbon application, 24 layers of soot having the composition: 15 wt. % $P_2O_5$, 10 wt. % $GeO_2$ and 75 wt. % $SiO_2$ were deposited to form a stratum 0.6 mm thick. Following deposition of the thin stratum, six layers of soot were deposited in which the $SiCl_4$, $GeCl_4$ and $POCl_3$ carrier gas and the fuel $O_2$ and $CH_4$ were linearly varied from the stratum soot flow rates to the core flow rates. This produces a linear taper in oxide concentration levels as illustrated in FIG. 5. The flow rates at the end of the six layers are those specified for the core in Table 1. The composition of the core soot at this point was about 20 wt. % $GeO_2$, 1.6 wt. % $P_2O_5$ and 78.4 wt. % $SiO_2$. The $GeCl_4$ and $POCl_3$ carrier flows were then parabolically graded to zero in 276 layers to form the core soot coating. The outside diameter of the core portion of the preform was about 1.47 cm. The cladding coating was then deposited during the next 540 burner passes during which the carrier flow for the $GeCl_4$ and $POCl_3$ remained cut off. The outside diameter of the resultant soot preform was 6.13 cm.

After removing the mandrel, the preform was suspended in the consolidation furnace by the integral silica handle. The bottom tip of the preform was plugged with a 6 nm O.D. borosilicate plug having a 1 mm hole therethrough, and the aperture was pressurized to 1.0 psi with a drying gas comprising a mixture 5% $Cl_2$—95% He. The preform was lowered through a 1460° C. hot zone at a rate of approximately 4 mm/min. while the aperture pressure was controlled at 1.0 psi by a bypass regulator. The furnace atmosphere flows from orifices 72 were the same as specified in Example 1. After consolidation, the blank was essentially seed-free and had an outside diameter of 3.2 cm. The silica handle was removed and a 91 cm silica tube having a 25 cm outside diameter was fused to the blank for use as a draw handle. The blank was drawn at 2200° C. to form six 1.0 km fibers having core diameters of about 50 mm and outside diameters of about 125 mm. The attenuation of the fibers at 850 nm ranged from 2.88 dB/km to 4.5 dB/km. The bandwidth ranged from 378 MHz-km to 640 MHz-km.

EXAMPLE 3

A soot preform was constructed in accordance with Example 2 except that the flow rates were changed as indicated in Table 1. Twelve layers of soot having a composition of 24 wt. % $P_2O_5$, 8 wt. % $GeO_2$ and 68 wt. % $SiO_2$ were deposited to form a low viscosity stratum having a thickness of 0.3 mm. Following the deposition of the stratum, six layers of soot were deposited in which the $SiCl_4$, $GeCl_4$ and $POCl_3$ carrier gas and the fuel $O_2$ and $CH_4$ were linearly varied from the stratum soot flow rates to the core soot flow rates. The flow rates at the end of the six layers are those specified for the core in Table 1, the soot composition was approximately 21.5 wt % $GeO_2$, 1.5 wt. % $P_2O_5$ and 77 wt. % $SiO_2$. The soot preform was consolidated in accordance with Example 2 to provide a solid glass blank having no centerline seeds. The blank was drawn in accordance with Example 2 to provide an optical waveguide fiber having a 50 mm diameter core and a 125 mm outside diameter. The attenuation of the resultant fiber at 850 nm was 3.5 dB/km and the bandwidth was 420 MHz-km.

EXAMPLE 4

A soot preform was formed in accordance with Example 2 except for the following modifications. Flow rates were changed as specified in Table 1. Twelve layers of soot were deposited to form a 0.3 mm thick low viscosity stratum having a composition of 21.1 wt. % $P_2O_5$, 7 wt. % $GeO_2$ and 71.9 wt. % $SiO_2$.

In this example there was no transition between the thin stratum and the core coating. After deposition of the stratum soot, the burner was tilted away from the blank and the flows were changed to the core flows listed in Table 1. This process was accomplished in approximately 50 seconds. The burner was then returned to its initial position wherein it was directed at the mandrel. With the initial core flow rates specified in Table 1, the composition of the soot was 20 wt. % $GeO_2$, 1.5 wt. % $P_2O_5$ and 78.5 wt. % $SiO_2$. The $GeCl_4$ and $POCl_3$ carrier flows were then parabolically graded to zero in 282 layers to form the core soot coating. The outside diameter of the core portion of the preform was about 1.4 cm. The cladding coating was then deposited during the next 520 burner passes during which the carrier flow for the $GeCl_4$ and $POCl_3$ remained cut off. The outside diameter of the resultant soot preform was 5.8 cm. The soot preform was consolidated in accordance with Example 2 to form a solid, seed-free glass blank. This blank was drawn in accordance with Example 2 to form a 125 mm outside diameter fiber having a 50 mm core diameter. The attenuation of the resultant fiber at 850 nm was 2.42 dB/km and the bandwidth thereof was 502 MHz-km.

We claim:

1. A method of forming a high purity glass article comprising the steps of
   providing a substantially cylindrical mandrel,
   applying to said mandrel a stratum of low viscosity glass soot,
   applying a first coating of glass soot to the outside peripheral surface of said stratum,
   applying a second coating of glass soot over the outside peripheral surface of said first coating, the glass soot of said second coating having a refractive index less than that of the glass soot of the first coating, the viscosity of said second coating being greater than that of said first coating and the viscosity of said first coating being greater than that of said stratum at the consolidation temperature of said second coating,
   removing said mandrel to form a soot preform having an aperture therein, the thickness of said stratum being sufficiently great that a continuous layer of said low viscosity material remains on the inner surface of said first coating after the step of removing said mandrel has been completed, and
   forming the structure so formed into a desired glass article.

2. A method in accordance with claim 1 wherein the step of forming comprises
   heating said preform to a sufficiently high temperature for a sufficient period of time to permit the soot at at least one end thereof to consolidate, and simultaneously
   drawing the consolidated portion of said preform to reduce the cross-sectional area thereof and close said aperture, thereby forming an optical waveguide filament.

3. A method in accordance with claim 1 wherein the step of forming comprises heating said preform to a sufficiently high temperature for a sufficient period of time to permit said stratum and said first and second soot coatings to consolidate and to permit said aperture to simultaneously close.

4. A method in accordance with claim 1 wherein the viscosity of said stratum is less than 1/10 the viscosity of said first coating at the consolidation temperature of said second coating.

5. In a method of forming a high purity glass article comprising the steps of
   providing a substantially cylindrical mandrel,
   applying a first coating of glass soot to the outside peripheral surface of said mandrel,
   applying a second coating of glass soot over the outside peripheral surface of said first coating, the glass soot of said second coating having a refractive index less than that of the glass soot of the first coating,
   removing said mandrel to form a soot preform having an aperture therein,
   heating said preform to a sufficiently high temperature for a sufficient period of time to permit said first and second soot coatings to consolidate and to permit said aperture to close, and
   forming the structure so formed into a desired glass article,
   the improvement comprising:
      applying to said mandrel prior to the application of said first coating a stratum of low viscosity glass soot, the thickness of said stratum being sufficiently great that a continuous layer of said low viscosity material remains on the inner surface of said first coating after the step of removing said mandrel has been completed.

6. A method in accordance with claim 5 wherein the thickness of said soot stratum is at least 0.15 mm.

7. A method in accordance with claim 6 wherein said stratum contains at least 7 wt. % $P_2O_5$ as the viscosity-depressing component.

8. A method in accordance with claim 7 wherein, prior to the step of applying said stratum, a coating of soft, release material is applied to said mandrel.

9. A method in accordance with claim 7 wherein said stratum is formed on a soot having a binary glass composition.

10. A method in accordance with claim 7 wherein said stratum is formed of a soot having a ternary glass composition.

11. A method in accordance with claim 6 wherein the step of heating said preform to permit said coatings to consolidate and to permit said aperture to close comprises heating said preform in a helium-rich atmosphere.

12. A method in accordance with claim 5 wherein the step of forming comprises heating the structure so formed to the drawing temperature of the materials thereof, and drawing the heated structure to reduce the cross-sectional area thereof, thereby forming an optical waveguide fiber.

13. A method in accordance with claim 5 wherein, during the step of heating said preform to permit said coatings to consolidate and to permit said aperture to close, a drying gas mixture is flowed into said preform aperture and outwardly through the interstices of said preform.

* * * * *